Figure 1:
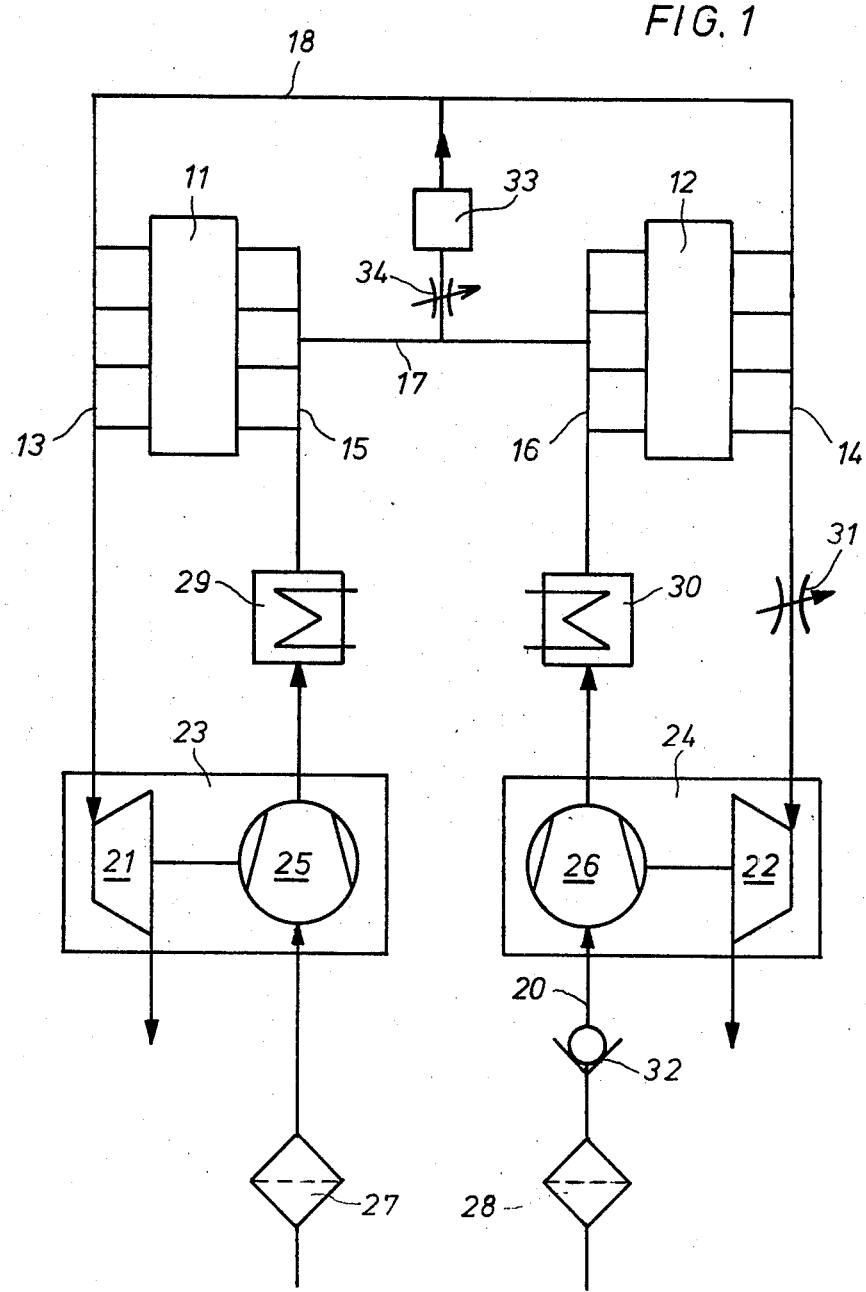

United States Patent [19]

Deutschmann

[11] 4,299,090
[45] Nov. 10, 1981

[54] INTERNAL COMBUSTION ENGINE WITH AT LEAST TWO EXHAUST GAS TURBOCHARGERS

[75] Inventor: Herbert Deutschmann, Friedrichshafen, Fed. Rep. of Germany

[73] Assignee: Motoren-und- Turbinen-Union Friedrichshafen GmbH, Friedrichshafen, Fed. Rep. of Germany

[21] Appl. No.: 86,418

[22] Filed: Oct. 19, 1979

[30] Foreign Application Priority Data

Mar. 24, 1979 [DE] Fed. Rep. of Germany ....... 2911727

[51] Int. Cl.³ .......................................... F02B 37/00
[52] U.S. Cl. ...................................... 60/612; 60/606
[58] Field of Search ................... 60/606, 612; 415/13, 415/26; 417/3, 47, 295, 298, 247, 286, 405, 406, 424; 123/562

[56] References Cited

U.S. PATENT DOCUMENTS

| | | | |
|---|---|---|---|
| 2,380,777 | 7/1945 | Moss | 60/612 X |
| 2,773,348 | 12/1956 | Grieshaber et al. | 60/612 X |
| 4,112,684 | 9/1978 | Tholen | 60/612 X |

FOREIGN PATENT DOCUMENTS

| | | | |
|---|---|---|---|
| 850965 | 9/1952 | Fed. Rep. of Germany | 60/612 |
| 2609389 | 9/1977 | Fed. Rep. of Germany | 60/612 |
| 2809202 | 9/1979 | Fed. Rep. of Germany | 60/612 |
| 2005765 | 4/1979 | United Kingdom | 60/612 |

*Primary Examiner*—Michael Koczo, Jr.
*Attorney, Agent, or Firm*—Craig and Antonelli

[57] ABSTRACT

A cylinder-piston internal combustion engine which includes at least two single or two two-stage exhaust gas turbochargers which together and in parallel supply the cylinder of the internal combustion engine with charging air when there is a large supply of exhaust gases from the internal combustion engine. When there is a small amount of exhaust gases available, at least one of the exhaust gas turbochargers is adapted to be switched off so as to increase the charging pressure. A check valve is disposed in a suction line of a compressor of the exhaust gas turbocharger which is adapted to be switched off with the check valve allowing a flow of air in a suction line of the compressor in a direction of the compressor but prevents a flow of air in an opposite direction.

9 Claims, 2 Drawing Figures

INTERNAL COMBUSTION ENGINE WITH AT LEAST TWO EXHAUST GAS TURBOCHARGERS

The present invention relates to an internal combustion engine, and, more particularly, to a cylinder-piston internal combustion engine which is adapted to be charged by at least two single or two two-stage exhaust turbochargers which together and in parallel supply the cylinder of the internal combustion engine with a charging air when there is a large supply of exhaust gases from the internal combustion engine and wherein at least one of the turbochargers is adapted to be switched off by a blocking of an associated exhaust intake line when a small amount of exhaust gas is available.

With an internal combustion engine of the aforementioned type, in partial load operations, all of the exhaust gases of the internal combustion engine are led to the remaining or non-switched off exhaust turbochargers and such turbochargers are then driven near their optimum point thereby operating with a better degree of efficiency. Consequently, the operating exhaust gas turbochargers are able to produce a higher charging pressure as well as a greater quantity of charging air. Moreover, the combustion characteristics of the internal combustion engine are significantly improved by the provision of a greater excess of air and fuel consumption is markedly reduced. Furthermore, a relatively smoke-free operation is readily obtained even with internal combustion engines that are designed for operation with a high average operating pressure.

However, in the aforementioned internal combustion engine constructions, some difficulties are encountered in the switching in of the stopped exhaust gas turbochargers when a supply of the exhaust gases of the internal combustion engine rises beyond an acceptance capability of the switched-in exhaust gas turbocharger.

In German Pat. No. 850,965, an internal combustion engine of the aforementioned type is proposed wherein the charging air line or conduit, on a pressure side of a compressor of an exhaust gas turbocharger that is adapted to be switched off, is provided with a valve or check valve against which the compressor must run up when it is switched in. However, because of the necessary high pressure ratio when the quantity to be delivered is not available, the compressor of the exhaust gas turbocharger works in the unsteady surging range so that it is not capable of reaching the pressure level in the charging air line.

In Offenlegungsschrift No. 26 09 389, an internal combustion engine construction is proposed wherein a check means is provided upstream and downstream of each compressor of a two-stage exhaust gas turbocharger which is adapted to be switched off. By an opening of the exhaust gas check means, in switching, the exhaust gas turbocharger is first run up and then after is reaches an rpm that corresponds to that of the permanently switched-in exhaust gas turbocharger, the check means upstream and downstream of the compressors are removed.

While surging of the compressor is avoided by the last-mentioned proposed construction because about the same pressure prevails upstream and downstream of the compressors while the exhaust gas turbocharger is running up, a disadvantage of such construction resides in the fact that there is a relatively high outlay required for measurement, control, and regulation in order to open or close a multiplicity of checking means at precisely the correct times. For example, if the switching in of the compressor is too early on the air side, there is the danger of the surging of the compressor. Moreover, the charging air can readily flow off by way of the compressor. If, for example, the checking means are opened too late, there is the danger of too high of an rpm for the exhaust gas turbocharger because the load is missing at the forward end of the compressor. Moreover, one has to doubt that a suitable regulation can be effected successfully because the running up of the exhaust gas turbocharger occurs in a very short period of time so that there are only fractions of a second available for actuation of the respective check means at precisely the correct moment.

The aim underlying the present invention essentially resides in providing a cylinder-piston internal combustion engine by which a switching in and switching out of an exhaust gas turbocharger on a charging air side of the engine can be effected in a simple manner which will reliably prevent surging of the compressor during a switching in process. In accordance with an advantageous feature of the present invention, a check valve means is disposed in a suction conduit of the compressor or low pressure compressor of the exhaust gas turbocharger that is adapted to be switched off with the check valve means allowing a flow of air toward the compressor in the suction conduit but preventing a flow of air in an opposite direction.

By virtue of the disposition of a check valve means in accordance with the present invention, when the exhaust gas turbocharger is cut off, a flowing off of the charging air from the charging air conduit of the internal combustion engine by way of the compressor is prevented by a blocking of the suction conduit and a smooth switch on of the compressor of the switched off exhaust gas turbocharger after opening of the exhaust line and acceleration of the exhaust gas charger at the start of delivery by the compressor is automatically made possible. In this manner, the switching on and off of the turbocharger can be initiated very simply and requires only an opening or closing of the exhaust line. The valve means in the exhaust line can be actuated in a conventional manner depending upon the requirements, as a function of control magnitudes such as, for example, the charging air pressure, the engine rpm, the setting of regulating rods, etc. One or more of these control magnitudes may be sensed by a sensor and, for example, a signal from the sensor may be fed to an electronic control means such as, for example, a comparator which, when an ideal value is sensed, provides an output signal for actuating the exhaust valve by way of, for example, an electromagnet, a compressed air cylinder or a pressurized oil cylinder. It is not necessary to have a control for the check valve in the suction or intake line of the compressor.

Additionally, the time span in which the opening or checking of the exhaust intake conduit occurs can be selected according to the specific requirements of, for example, the exhaust gas turbine, because the connection or disconnection of the exhaust gas turbocharger on the air side occurs automatically at exactly the right moment. Additionally, since approximately the same pressure prevails both upstream and downstream of the compressor, namely, the charging air pressure of the permanently switched on exhaust gas turbocharger is effective, a surging of the compressor during a switching on process does not occur. Thus, no air volumes are delivered. Furthermore, if the pressure downstream of the compressor tends to rise above the pressure prevailing in the charging air line, delivery of air begins simultaneously by an automatic opening of the check valve. Thus, the compressor is always in a stable range of its rated characteristics.

Advantageously, because of the zero delivery of the compressor during a switching in of the exhaust gas turbocharger, all of the converted output of the exhaust gas turbine can be utilized for acceleration and no fraction for delivery has to be tapped off. Consequently, the switched in exhaust gas turbocharger rapidly reaches its operational rpm.

With the automatic opening of the check valve means in accordance with the present invention, the increase in the rpm of the exhaust gas turbocharger in acceleration is stopped at the right moment by the start of delivery by the associated compressor thereby reliably preventing a racing of the exhaust gas turbocharger. Moreover, the rpm that results for the switched in exhaust gas turbocharger is always adapted to the current rpm of the operating exhaust gas turbocharger. This correspondence between the relative speeds of the exhaust gas turbochargers is brought about by the charging pressure that is a function of the rpm of the switched on exhaust as turbocharger which determines the beginning of delivery by the switched in compressor and thereby determines its rpm.

In accordance with further advantageous features of the present invention, after a switching in of an exhaust gas turbocharger and until just before the switching off of such turbocharger, the associated check valve means in the suction line is controlled so that it is in an open setting. By virtue of this arrangement, a reduction of the flow resistance in the suction line of the switched off exhaust gas turbocharger is effected.

With very highly loaded internal combustion engines with a very small number of exhaust gas turbochargers, after the switching on process the exhaust can advantageously be increased by employing a conventionally constructed combustion chamber that is disposed between the charging airline and the exhaust line. As can be appreciated, the combustion chamber can also be used to drive the exhaust gas turbochargers during an acceleration of the internal combustion engine.

Accordingly, it is an object of the present invention to provide an internal combustion engine construction with at least two exhaust gas turbochargers which avoids, by simple means, shortcomings and disadvantages encountered in the prior art.

Another object of the present invention resides in providing an internal combustion engine with at least two exhaust gas turbochargers by which at least one of the exhaust gas turbochargers may be switched on and switched off without requiring expensive control and regulation apparatus.

A further object of the present invention resides in providing an internal combustion engine construction with at least two exhaust gas turbochargers which ensures an automatic switching in and switching off of at least one of the exhaust gas turbochargers at precisely the proper moment in time so as to enhance the overall operating efficiency of the internal combustion engine.

Yet another object of the present invention resides in providing an internal combustion engine with at least two exhaust gas turbochargers which is simple in construction and therefore relatively inexpensive to manufacture.

A still further object of the present invention resides in providing an internal combustion engine construction with at least two exhaust gas turbochargers which functions reliably under all operational load conditions of the engine.

Figure 2:
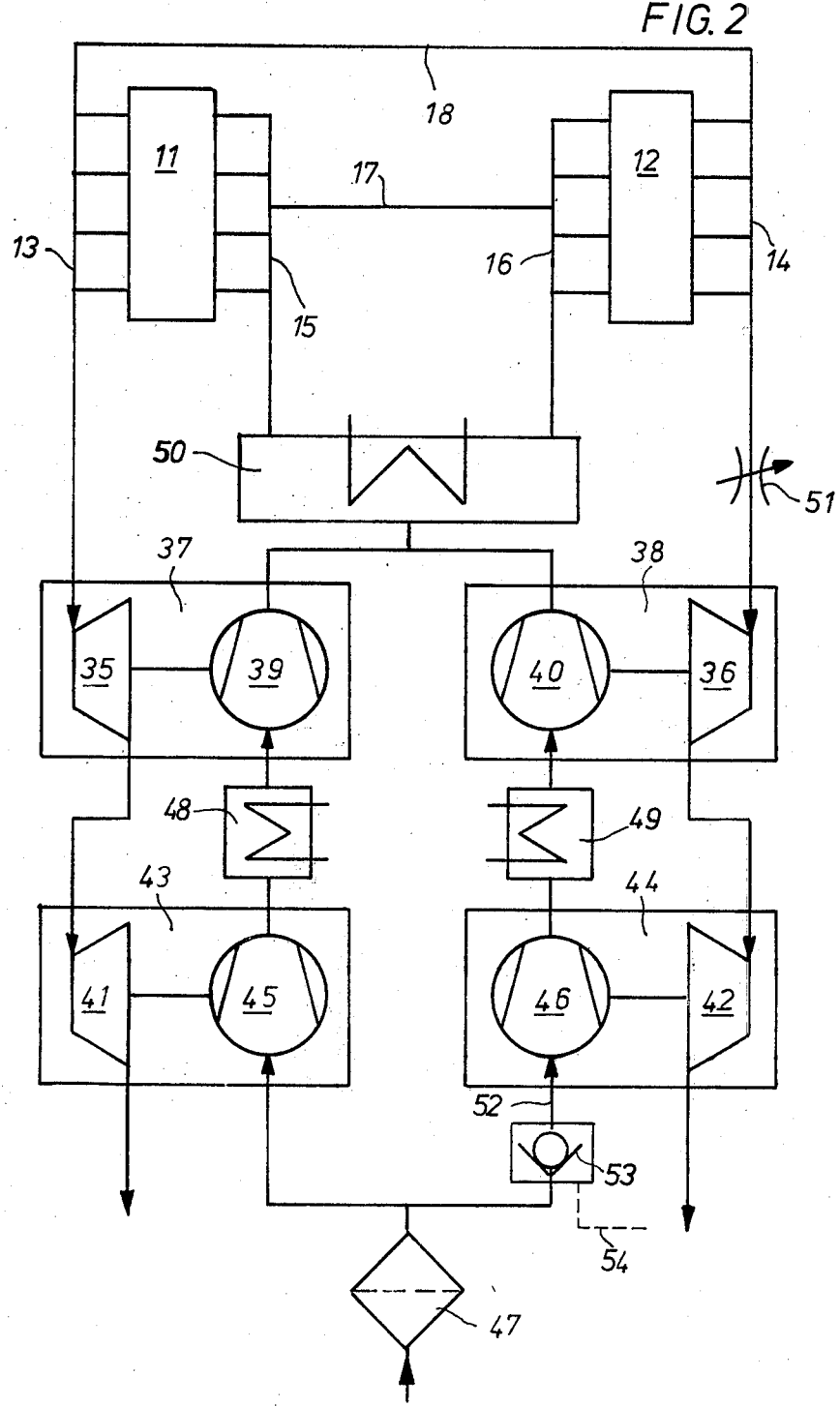

These and other objects, features, and advantages of the present invention will become more apparent from the following description when taken in connection with the accompanying drawings which show, for the purposes of illustration only, two embodiments in accordance with the present invention, and wherein:

FIG. 1 is a schematic view of an internal combustion engine in accordance with the present invention provided with two single stage exhaust gas turbochargers; and FIG. 2 is a schematic view of an internal combustion engine in accordance with the present invention provided with two two-stage exhaust gas turbochargers.

Referring now to the drawings wherein like reference numerals are used in both views to designate like parts and, more particularly, to FIG. 1, according to this figure, an internal combustion engine is provided which includes two rows of cylinders 11, 12 with an exhaust manifold or collector conduit 13, 14 and an intake manifold or charging air conduit 15, 16 provided at the respective cylinder rows 11, 12. The two charging air conduits 15, 16 are connected by a suitable connecting conduit 17 with the two exhaust gas manifolds 13, 14 being interconnected by a crossover manifold or conduit 18.

The exhaust manifolds 13, 14 are respectively connected to exhaust gas turbines 21, 22 of two exhaust gas turbochargers 23, 24 so that exhaust gases are directed from the exhaust manifolds 13, 14 to the respective exhaust gas turbines 21, 22. The exhaust gas turbines are adapted to drive compressors 25, 26 which compressors suck or draw in charging air by way of suction air filters 27, 28 and force the charging air by way of charging coolers 29, 30 into the respective charging air lines 15, 16.

An adjustable exhaust valve 31 is disposed between the exhaust manifold 14 and the exhaust gas turbine 22 by which delivery of exhaust gases to the exhaust gas turbine 22 can be selectively controlled. A check valve 32 is disposed in a suction or inlet conduit 20 provided between the air filter 28 and inlet side of the compressor 26. The check valve 32 allows a flow of air into the suction conduit toward the compressor 26 but prevents a flow in the opposite direction. The check valve 32 can be constructed as a back pressure valve and be adapted to be actuated by a pressure in the suction conduit 20.

A combustion chamber, constructed in a conventional manner, is disposed between the crossover manifold 18 and the connecting conduit 17 with an adjustable valve 34 being provided for selectively controlling the flow from the connecting conduit 17 into the combustion chamber 33.

Upon a starting up of the internal combustion engine and in all operating ranges of the engine in which there are only small quantities of exhaust gas, for example, in no load or partial load operation, the exhaust valve 31 is closed and the internal combustion engine is only charged by way of exhaust gas turbocharger 23. In such state, the charging air delivered by the compressor 25 flows in the charging air lines 15, 16 and passes by way of the charging air cooler 30 and the blades of the compressor 26 of the exhaust gas turbocharger 24 until such charging air reaches the check valve 32 which is closed by the pressure of the charging air so as to prevent an escape of such charging air. Thus, the same pressure prevails upstream and downstream of the blades of the compressor 26.

If the exhaust gas supply from the internal combustion engine becomes greater due, for example, to a rising load and/or an increase in the rpm, and the acceptance capability of the turbine 21 of the exhaust gas turbocharger is exceeded, the second exhaust gas turbocharger 24 is then switched in.

To effect a switching in of the exhaust gas turbocharger 24, the exhaust valve 31 is opened so that exhaust gases flowing through the turbine 22 can now quickly accelerate the exhaust gas turbocharger 24 because the compressor 26 is not surging and delivers no air so there is no delivery work involved. Only when the compressor 26, because of its rpm, is capable of producing a higher pressure than the already present charging pressure, will the valve 32 be opened by the vacuum in the suction conduit 20 so that delivery of charging air begins from the compressor 26. Thereby, the exhaust gas turbine 22 is loaded with the work of the air delivery and cannot increase the rpm of the exhaust gas turbocharger 24 any further.

With an opening of the check valve 32 in the suction conduit 20, the switching in process is completed and the internal combustion engine can be driven in the customary way with both turbochargers 23, 24 in all operating ranges wherein a large amount of exhaust gas is available. However, it can happen that the charging pressure, especially in situations with a small overall number of exhaust gas turbochargers and a heavily loaded internal combustion engine, that the quantities of exhaust gases will be too low in a vicinity of the switching in point. In such a situation, the combustion chamber 33 is ignited so as to produce additional exhaust gases. The air quantity of the combustion chamber 33 is controlled by the adjustable valve 34 so that the amount of exhaust gas and therewith also the charging pressure can be selectively increased.

If the exhaust gas turbocharger 24 is to be once again switched off as the quantity of exhaust gas decreases, the valve 31 is closed and thereby the flow of exhaust gases that act on the turbine 22 is interrupted. After the rpm of the exhaust turbine 22 drops and thereby the quantity of charging air delivered by the compressor 26 drops, the valve 32 automatically closes because of the rising pressure in the suction conduit 20.

Since small leaks will naturally always be present at the exhaust valve 31, the exhaust gas turbine 22 will be impinged upon by small amounts of exhaust gas even when the valve 31 is in a closed position. Consequently, the exhaust turbine 22 will be kept warm by virtue of the exhaust gases so that a temperature shock load which would result by virtue of the opening of the valve 31 is reduced and the exhaust gas turbocharger 24 will be kept in motion at a lower rpm. To further reinforce this effect, if desired, the exhaust gas valve 31 can be positioned so as to be partially opened.

As shown in FIG. 2, two two-stage exhaust gas turbochargers 37, 43 and 38, 44 are disposed in parallel with exhaust gases from the respective exhaust manifolds 13, 14 being first directed to the high pressure exhaust gas turbines 35, 36 and then to the respective low pressure gas turbines 41, 42.

The high pressure gas turbine 35, 36 are respectively connected with high pressure compressors 39, 40 so as to form the exhaust gas turbochargers 37, 38 of the high pressure stage.

The low pressure exhaust gas turbines 41, 42 are respectively connected with low pressure compressors 45, 46 so as to form the exhaust gas turbochargers 43, 44 of the low pressure stage.

The compressors 45, 46 suck or draw in charging air by way of a common filter 47 and force the drawn in charging air by way of intermediate coolers 48, 49 and a common charging air cooler 50 into the charging air lines 15, 16 of the internal combustion engine.

An exhaust valve 51 is disposed between the exhaust manifold 14 and the high pressure exhaust gas turbine 36 of the exhaust gas turbocharger 38. A controllable check valve 53 is disposed in a suction conduit 52 disposed between the low pressure compressor 46 and the common filter 47. The check valve 53 and exhaust valve 51 cooperate in the same manner during a switching on and switching off of the exhaust gas turbochargers 38, 44 as the check valve 32 and exhaust valve 31 described hereinabove in connection with FIG. 1.

The check valve 53 is controllable in a conventional manner by electrical, hydraulic, or pneumatic means. For this purpose a control conduit or line 54 is provided. By adjustment of the check valve 53, flow resistance in the suction conduit 52 is reduced during operation of the exhaust gas turbochargers 38, 44.

To ensure an automatic operation of the check valve 53 in switching the exhaust gas turbochargers 38, 44 on and off, the adjustment should only occur when the exhaust gas turbocharger has reached its rpm. On the other hand, the adjustment must be taken off or removed in a switching off of the turbocharger before closure of the exhaust valve 51. These requirements can be met by the control device for the exhaust valve 51 in that, in switching on the exhaust gas turbocharger, the exhaust valve 51 is first opened and then, after a specific time, the check valve 53 is regulated or adjusted. In switching off the exhaust turbocharger, first the check valve 53 is adjusted or regulated and thereafter the closure of the exhaust valve 51 is effected.

Naturally, the actuation of the adjustment can also be controlled by a control device as a function of the rpm of the exhaust gas turbocharger or pressure in the suction conduit 52.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A cylinder-piston internal combustion engine which includes two exhaust gas turbocharger means arranged in parallel for both supplying the cylinder of the internal combustion engine with charging air when there is a large supply of exhaust gases, each exhaust gas turbocharger means including an exhaust gas turbine for driving a charging air compressor means, and means for switching off at least one of the exhaust gas turbocharger means when only a small amount of exhaust gas is available so as to increase a pressure of the charging air, characterized in that a check valve means is disposed in a suction line of the compressor means of the exhaust gas turbocharger means which can be switched off for allowing a flow of air in the suction line in a direction of the compressor means but preventing a flow of air in an opposite direction, said check valve means being adapted to be automatically opened and closed by a suction effect of the compressor means of the exhaust gas turbocharger means which can be switched off, and in that means are provided for communicating the exhaust gas turbocharger means which can be switched off with the remaining exhaust gas turbocharger means so that a pressure produced by the compressor means of the remaining exhaust gas turbocharger means acts on both a pressure and suction side of the compressor means of the exhaust gas turbocharger means which can be switched off.

2. A cylinder-piston internal combustion engine according to claim 1, characterized in that means are provided for controlling a positioning of the check valve means so that the check valve means is held in an open position after a switching-in of the exhaust gas turbocharger means until just before a switching-off of the exhaust gas turbocharger means.

3. A cylinder-piston internal combustion engine according to one of claims 1 or 2, characterized in that an exhaust gas line means is provided for directing a flow of exhaust gases to both exhaust gas turbocharger means, the means for communicating the exhaust gas turbocharger means with the remaining exhaust gas turbocharger means includes charging air line means disposed between the respective compressor means of the exhaust gas turbocharger means and the cylinder of the internal combustion engine and a connecting conduit means for connecting the charging air line means with each other, and in that a combustion chamber means is arranged between the exhaust gas line means and the charging air line means for supplying additional exhaust gases to the exhaust gas line means.

4. A cylinder-piston internal combustion engine according to claim 3, characterized in that means are provided for controlling a quantity of charging air fed from the charging air line means to the combustion chamber means.

5. A cylinder-piston internal combustion engine according to claim 4, characterized in that the means for switching off the exhaust gas turbocharger means includes a controllable exhaust valve means disposed in the exhaust gas line means for selectively interrupting a flow of exhaust gases to the exhaust gas turbocharger means to be switched off.

6. A cylinder-piston internal combustion engine according to claim 5, characterized in that at least one charging air cooler means is disposed in the charging air line means between the compressor means and the cylinder of the internal combustion engine.

7. A cylinder-piston internal combustion engine according to one of claims 1 or 2, characterized in that each of the exhaust gas turbocharger means is constructed as a two-stage exhaust gas turbocharger which includes a high pressure exhaust gas turbine means for driving a high pressure compressor and a low pressure exhaust gas turbine means for driving a low pressure compressor.

8. A cylinder-piston internal combustion engine according to claim 7, characterized in that the means for switching off the exhaust gas turbocharger means includes a controllable exhaust valve means for selectively interrupting a flow of exhaust gases to the exhaust gas turbocharger means to be switched off.

9. A cylinder-piston internal combustion engine according to claim 8, characterized in that a charging air cooler means is arranged between an input side of the high pressure compressor means and an output side of the low pressure compressor means of each of the two-stage exhaust gas turbochargers, and in that a further common charging air cooler means is arranged at an output side of each of the high pressure compressor means of the respective two-stage exhaust gas turbochargers.

* * * * *